United States Patent
Oh

(10) Patent No.: US 6,842,488 B2
(45) Date of Patent: Jan. 11, 2005

(54) VSB/QAM RECEIVER AND METHOD

(75) Inventor: Ji-sung Oh, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 719 days.

(21) Appl. No.: 09/794,159

(22) Filed: Feb. 28, 2001

(65) Prior Publication Data

US 2001/0048723 A1 Dec. 6, 2001

(30) Foreign Application Priority Data

May 4, 2000 (KR) ............................................. 00-23985

(51) Int. Cl.[7] .............................................. H04L 23/02
(52) U.S. Cl. ...................... 375/261; 375/321; 375/355; 329/304; 348/555
(58) Field of Search ................................ 375/261, 321, 375/355; 329/304; 348/555

(56) References Cited

U.S. PATENT DOCUMENTS

| | | | | |
|---|---|---|---|---|
| 5,673,293 A | * | 9/1997 | Scarpa et al. ................ | 375/321 |
| 6,128,357 A | * | 10/2000 | Lu et al. ...................... | 375/355 |
| 6,160,443 A | * | 12/2000 | Maalej et al. ................ | 329/304 |
| 6,480,236 B1 | * | 11/2002 | Limberg ....................... | 348/555 |

FOREIGN PATENT DOCUMENTS

| | | |
|---|---|---|
| JP | 6-291791 A | 10/1994 |
| JP | 10-56489 A | 2/1998 |
| JP | 10-126457 A | 5/1998 |
| JP | 10-290266 A | 10/1998 |
| JP | 11-205403 A | 7/1999 |
| JP | 2001-501404 A | 1/2001 |
| JP | 2001-505727 A | 4/2001 |
| WO | WO 98/14005 A1 | 4/1998 |

* cited by examiner

*Primary Examiner*—Shuwang Liu
*Assistant Examiner*—Eva Yi Zheng
(74) *Attorney, Agent, or Firm*—Sughrue Mion, PLLC

(57) ABSTRACT

A vestigial sideband/quadrature amplitude modulation (VSB/QAM) receiver, which receives both VSB and QAM signals and restores a carrier wave with a restored symbol clock after restoring a symbol timing in a front portion of a carrier wave restoration unit. The receiver has an analog-digital converter for A/D converting in accordance with a frequency higher than a symbol frequency of a received signal; an interpolator for calculating a signal value on the original symbol location after a signal from the A/D converter is applied; the carrier wave restoration unit for restoring a carrier wave by selectively using an automatic frequency control (AFC) and a digital frequency phase locked loop (DFPLL) in accordance with a VSB/QAM mode after a signal from the interpolator is applied; a timing processor for receiving a signal from the carrier wave restoration unit, detecting a timing error after changing a symbol input time in accordance with a VSB/QAM mode, controlling the interpolator based on the detected timing error, and generating a restored clock; and a VSB sorter for extracting a VSB receiving symbol.

7 Claims, 4 Drawing Sheets

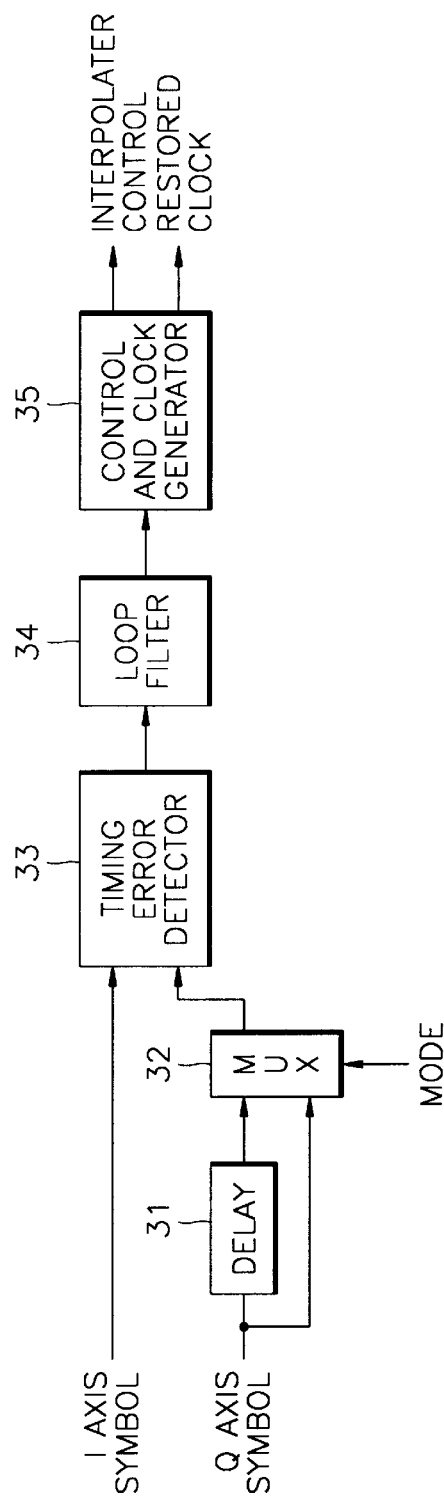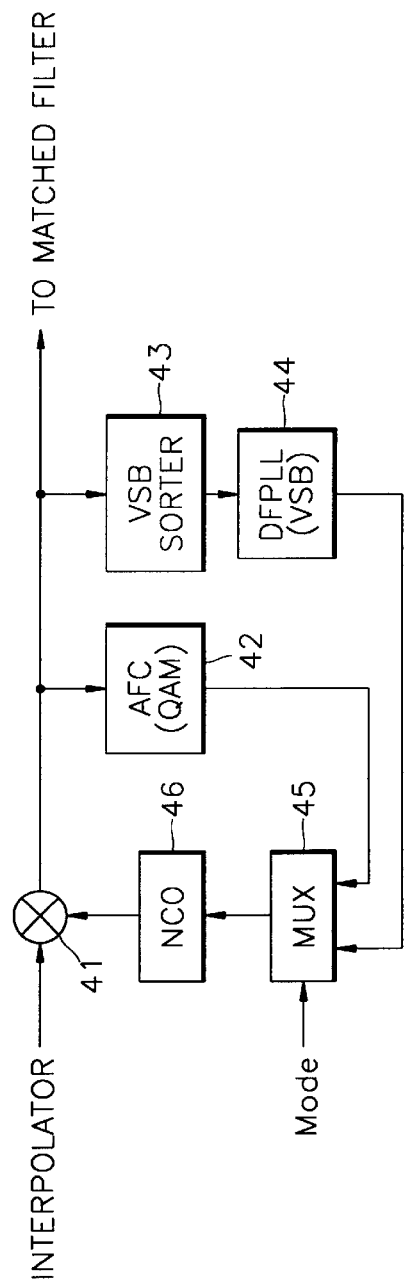

VSB/QAM RECEIVER AND METHOD

BACKGROUND OF THE INVENTION

1. Field of the Invention

The present invention relates to a digital broadcasting receiver, and more particularly, to a vestigial sideband/quadrature amplitude modulation (VSB/QAM) receiver, which receives both a VSB signal and a QAM signal so as to be used for both ground wave and cable transmission standards, and a method thereof.

The present application is based upon Korean Patent Application No. 00-23985, which is incorporated herein by reference.

2. Description of the Related Art

Digital broadcasting services providing video and audio information for multimedia services have recently become globally commercialized. For these digital broadcasts, a bit rate large enough to transmit video and voice signals in a broadcasting channel having a predetermined bandwidth should be secured. Digital broadcasts are provided via satellite, ground wave, or cable, according to the transmission media, which use different bandwidth and modulation methods. Cable and ground wave digital broadcast signals are transmitted through the same media as existing analog broadcast signals, and thus the frequency band is limited within the UHF/VHF range. Also, due to the coexistence with the analog broadcast signals, the bandwidth is defined to be the same as the existing analog broadcast signals. Therefore, to secure a high bit rate in the limited bandwidth, multilayer level modulation methods such as quadrature amplitude modulation (QAM) or a vestigial sideband (VSB) method are adopted. Since various digital broadcasts are provided through diverse transmission media, digital broadcasting receivers (e.g., a digital TV and a digital set-top-box) should be capable of receiving both QAM signals and VSB signals. Since a VSB/QAM receiver does not need a separate VSB receiver for the VSB signals, the hardware size is reduced.

FIG. 1 illustrates an ordinary VSB/QAM receiver, which is disclosed in the BroadCOM BCM3500 Specification, "QAM/VSB CATV/HDTV Receiver" dated Jun. 2, 1999. The receiver of FIG. 1 has an analog-digital (A/D) converter 12, an automatic frequency control (AFC) 13 for restoring a carrier wave, a mixer 14, and an interpolator 15 for extracting the original symbol from the restored carrier wave. The receiver of FIG. 1 also has a matched filter 16 for filtering the restored carrier wave and a timing processor 11 for restoring carrier wave/timing and controlling clocks.

In the VSB/QAM receiver of FIG. 1, the A/D converter 12 converts an analog signal to a digital signal in accordance with a clock, which has a predetermined frequency (usually 25 MHz), generated in the timing processor 11. The AFC 13 corrects frequency and phase distortions of a signal input to the mixer 14 in accordance with a clock having a predetermined frequency generated in the timing processor 11. The mixer 14 outputs the restored carrier wave to the interpolator 15. The interpolator 15 extracts a symbol from a signal input in accordance with a symbol clock generated in the timing processor 11. The matched filter 16 filters symbols extracted in the interpolator 15. The timing processor 11 generates the symbol clock by which timing is restored and provides the symbol clock as a driving clock for the interpolator 15 and the matched filter 16. That is, a clock used in A/D conversion and carrier wave restoration has a predetermined frequency regardless of the symbol clock by which timing is restored.

Here, a VSB signal is regarded as an offset QAM and the receiver has a QAM-type receiving structure as a whole.

This ordinary VSB/QAM receiver suffers from disadvantages. Since a carrier wave restoring loop is located in the front portion of the timing restoration loop, a carrier wave is restored by the A/D conversion clock and timing is restored by the symbol clock. Since in the ordinary VSB/QAM receiver the A/D conversion clock and symbol clock are not desynchronized, phase distortion can remain in a symbol and A/D conversion rate is greater than twice the ordinary symbol clock, which is disadvantageous in terms of power consumption and IC design.

SUMMARY OF THE INVENTION

To overcome the above disadvantages of the ordinary receiver, it is an object of the present invention to provide a VSB/QAM receiver and method in which by restoring symbol timing in the front portion of a carrier wave restoration loop for a signal, a symbol clock by which timing is restored can be used in restoring a carrier wave and as a result phase distortions in a symbol are removed.

To accomplish the above object of the present invention, there is provided a vestigial sideband/quadrature amplitude modulation (VSB/QAM) receiver having an analog-digital converter for converting a received analog signal into a digital signal in accordance with a clock having a predetermined frequency. An interpolator restores symbol timing by interpolating in an original location of a symbol a digital signal received from the analog-digital converter in accordance with a control of a timing processor. A carrier wave restoration unit restores a carrier wave of the digital signal by correcting distortions in frequency and phase of the symbol signal interpolated in the interpolator in accordance with a driving clock of the timing processor. A filter matches a symbol signal in the carrier wave restored by the carrier wave restoration unit. The timing processor calculates a timing error in the filtered symbol signal, controls the interpolator based on the detected timing error, and generates the driving clock. Finally, a VSB sorter outputs the symbol output from the filter, the symbol in which the carrier wave and timing are restored, without change, or outputs the symbol after rearranging the symbol in accordance with a VSB/QAM mode.

To accomplish another object of the present invention, there is also provided a method for receiving both a VSB signal and a QAM signal in a VSB/QAM receiver. In this method, an analog signal is converted into a digital signal in accordance with a predetermined clock. A symbol is extracted in the original symbol location by interpolating the digital signal converted in the conversion step. A carrier wave is restored by correcting frequency and phase distortions of the symbol, which is extracted in the extracting step in accordance with a clock in which symbol timing is restored. A timing error is calculated based on the signal restored in the restoring step, the symbol timing is restored by controlling the interpolation location of the extraction in accordance with the calculated timing error, and a clock in which timing is restored is generated. Finally, a signal, in which symbol timing and carrier wave are restored, without change, is output, the signal after rearranging the signal in accordance with a VSB/QAM mode is output.

BRIEF DESCRIPTION OF THE DRAWINGS

The above objects and advantages of the present invention will become more apparent by describing in detail a preferred embodiment thereof with reference to the attached drawings in which:

FIG. 3 is a detailed diagram of the timing processor of the receiver of FIG. 2;

FIG. 4 is a detailed diagram of the carrier wave restoration unit of the receiver of FIG. 2;

DETAILED DESCRIPTION OF THE INVENTION

Figure 1:
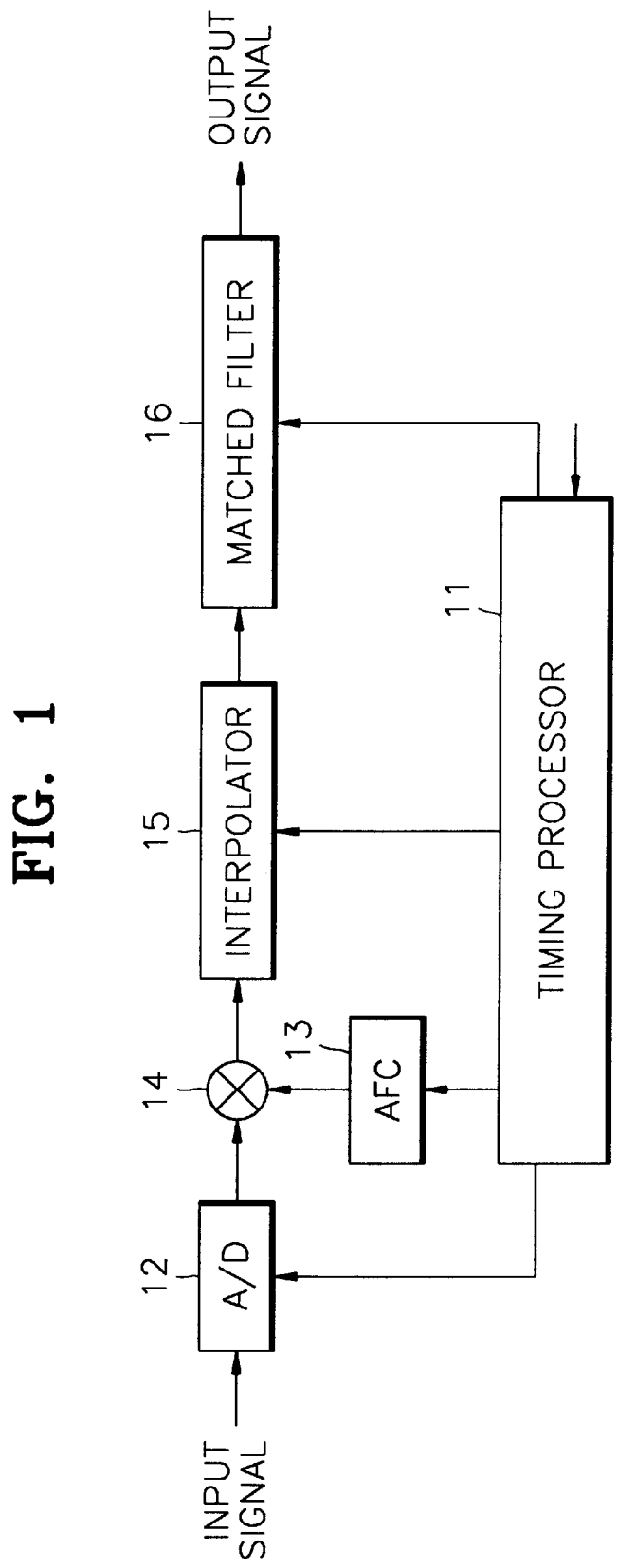
FIG. 1 illustrates an ordinary vestigial sideband/quadrature amplitude modulation (VSB/QAM) receiver.
Figure 2:
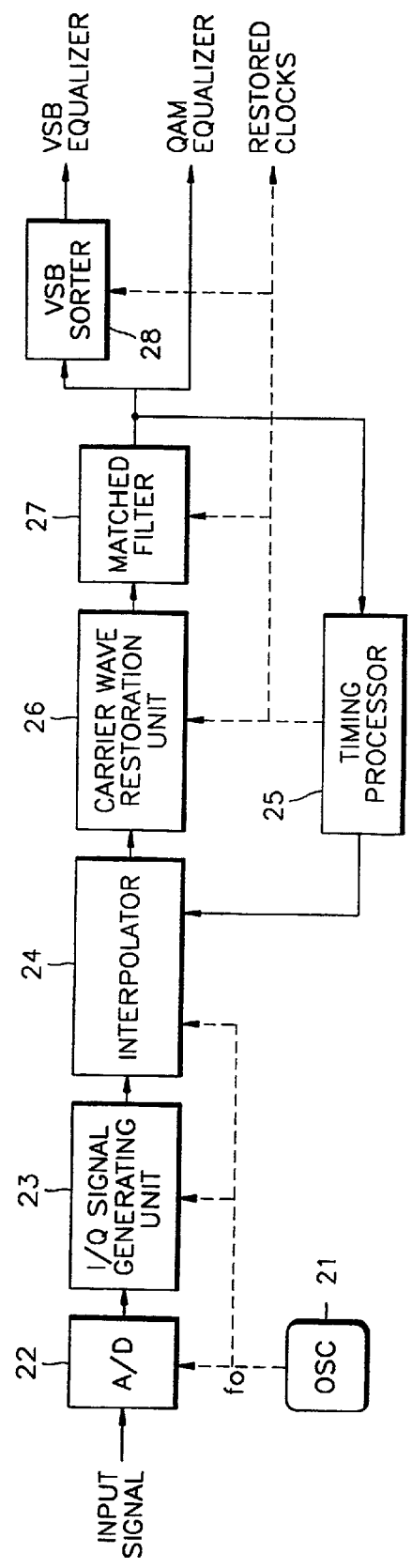
FIG. 2 illustrates a VSB/QAM receiver according to the present invention.

FIG. 2 illustrates a VSB/QAM receiver according to the present invention. The receiver of FIG. 2 has an oscillator (OSC) 21 for generating a clock having a predetermined frequency ($f_0$), an A/D converter 22 for converting a received analog signal into a digital signal with respect to the clock having the predetermined frequency ($f_0$), and an in-phase/quadrature (I/Q) signal generating unit 23 for outputting a digital signal in a complex form. Also, unlike the ordinary receiver of FIG. 1, the receiver of FIG. 2 has an interpolator 24 on the front portion of a carrier wave restoration unit 26, which compensates the frequency and phase of the digital signal. A matched filter 27 filters a signal output from the carrier wave restoration unit 26. A timing processor 25, which is connected to the matched filter 27, controls the interpolator 24, and provides a symbol clock, by which timing is restored, to each block as a driving clock. A VSB sorter 28, which is connected to the matched filter 27, re-sorts an input VSB signal. The detailed structure of the timing processor 25 is shown in FIG. 3, and the detailed structure of the carrier wave restoration unit 26 is shown in FIG. 4.

The QAM/VSB receiver of the present invention is implemented by basically adopting a full digital reception method. That is, using a clock having a predetermined frequency ($f_0$) generated by the oscillator 21, a received analog signal is converted into digital form. Here, the clock frequency ($f_0$) being used is higher than the transmitted symbol frequency. QAM and VSB methods for cable and ground wave digital broadcasting have various bandwidths and transmission symbol rates as listed in the following table 1:

TABLE 1

| Digital TV Standard Annex | Annex A (64 QAM) | Annex B (64 QAM) | Annex B (256 QAM) | Annex C | Annex D |
|---|---|---|---|---|---|
| Bandwidth | 8 MHz | 6 MHz | 6 MHz | 6 MHz | 6 MHz |
| Symbol Rate | 6.88695 Msps | 5.05694 Msps | 5.36054 Msps | 5.30973 Msps | 10.76224 Msps |
| Information Bit Rate | 38.08081 Mbps | 26.97035 Mbps | 38.81070 Mbps | 29.35970 Mbps | 19.28951 Mbps (8 VSB) 38.57902 Mbps (16 VSB) |
| Roll-off | 0.15 | 0.18 | 0.12 | 0.13 | 0.1152 |

The receiver needs a structure in which carrier waves and timing for these modes can be smoothly restored. Therefore, the receiver of the present invention is constructed considering a QAM/VSB mode change and processing method for restoring a carrier wave and timing, both being interlocked to each other.

Referring to FIG. 2, a signal, which is converted into a digital form through the A/D converter 22, is input to the I/Q signal generating unit. The I/Q signal generating unit 23 outputs the input digital signal in a complex form of in-phase (I) axis data and quadrature (Q) axis data, in accordance with a clock having an oscillation frequency $f_0$. The digital signal in the complex form is input to the carrier wave restoration unit 26 through the interpolator 24. The carrier wave restoration unit 26 corrects the frequency and phase distortion of the input digital signal and restores the carrier wave. This will be explained in more detail below with reference to FIG. 4.

The signal output from the carrier wave restoration unit 26 is fed back to the timing processor 25 through the matched filter 27. The timing processor 25 calculates timing errors to restore timing and generates a location signal which indicates the optimal symbol location. More specifically, referring to FIG. 3, the timing processor 25 processes a VSB signal as a QAM signal. That is, if a VSB signal is demodulated based on a central frequency as a QAM, the VSB signal can be regarded as an offset QAM having a 5.38 MHz symbol rate. Therefore, the timing processor 25 can restore timing regardless of QAM or VSB mode. However, since an offset of a half symbol cycle (T/2) occurs between the I axis symbol and the Q axis symbol in the VSB signal processed as the offset QAM, this offset should be corrected. Therefore, the timing processor 25 delays either of the I axis symbol and the Q axis symbol, which are input, by a half symbol cycle (T/2). The I axis symbol output from the matched filter 27 is input to a timing error detector 33. Also, the Q axis symbol is input to a delay 31 and at the same time to a multiplexor 32. The delay 31 delays the input Q axis symbol by a half symbol cycle (T/2) and outputs the symbol to the multiplexor 32. The multiplexor 32 selects between the Q axis symbol, which is currently input, and the Q axis symbol, which is delayed by a half symbol cycle (T/2), in accordance with the VSB/QAM mode, to output to the timing error detector 33. The multiplexor 32 selects the Q axis symbol, which is delayed by a half symbol cycle (T/2), if the mode is a VSB mode, and selects the Q axis symbol, which is currently input, if the mode is a QAM mode. The timing error detector 33 receives the I axis symbol and the Q axis symbol, which is selected by the multiplexor 32, determines the timing state, and detects a timing error, which indicates whether the current location of the symbol is before or after the optimal location of the symbol in time. The timing error detected by the timing error detector 33 is applied to a loop filter 34 and the loop filter 34 generates a control voltage. A control and clock generator 35 generates variable oscillation frequency clocks with respect to the control voltage generated in the loop filter 34 and controls the offset of the interpolator 24. Here, since the symbol rate of a VSB signal is twice as high as a QAM signal, the clock has the same frequency as the symbol rate or a frequency, which is ¼ of the symbol rate, with respect to the VSB and QAM signals. A clock in which symbol timing is restored in the timing processor 25 is provided to each block as a driving clock.

Referring again to FIG. 2, the interpolator 24 interpolates the complex form digital signal, which is input with respect to the clock having oscillation frequency $f_0$, in the original symbol location in accordance with the control of the timing processor 25, and outputs a digital signal in which timing is restored. Like this, since the digital signal output from the interpolator 24 is input again to the carrier wave restoration unit 26 to form a feedback loop, the restorations of symbol timing and carrier wave are interlocked to each other, and therefore, a phase distortion is removed. The timing processor 25 provides the restored symbol clock, which has a frequency that is the same as the symbol rate of the VSB signal, to the carrier wave restoration unit 26, the matched filter 27, and the VSB sorter 28, as a driving clock, and at the same time provides restored symbol clocks to blocks (not shown) of the end portion of the equalizer.

Since a pilot-tone for restoring a carrier wave is included in a VSB signal, the structure for restoring a carrier wave in a VSB signal is different from that of a QAM. Also, in order to use the same timing restoration means for both VSB and QAM signals, a VSB is regarded as an offset QAM. In a VSB signal output from the interpolator 24, a pilot-tone is in the about 2.69 MHz bandwidth, which is not a low frequency bandwidth. After the pilot-tone is moved to a low frequency bandwidth, the distortion of the frequency and phase of the carrier wave is calculated. This will now be explained in detail with reference to FIG. 4.

Referring to FIG. 4, symbols restored through the interpolator 24 are input to the AFC 42 and VSB 43 through the mixer 41. If the symbols in which timing is restored are QAM signals, the AFC 42 calculates frequency and phase distortions, and outputs distortion correction values to the multiplexor 45. If the outputs of the mixer 41 are VSB signals, the VSB sorter 43 re-sorts symbols. Then, a digital frequency and phase locked loop (DFPLL) 44 calculates frequency and phase distortions from the re-sorted symbols, and outputs distortion correction values to the multiplexor 45. The DFPLL 44 is a carrier wave restoration device based on digital signal processing. The multiplexor 45 selects each signal output from the AFC 42 and the DFPLL 44 in accordance with the VSB/QAM mode and outputs the signal to the NCO 46. That is, the multiplexor 45 selects a signal output from the AFC 42 if the current mode is QAM, and selects a signal output from the DFPLL 44 if the current mode is VSB, and by doing so, adjusts the NCO 46. The mixer 41 multiplies a signal output from the interpolator 24 by a signal output from the NCO 46 to compensate for the distortions of the frequency and phase. A symbol in which the carrier wave is restored is input to the matched filter 27. Here, the carrier wave is restored by a symbol clock restored in the timing processor 25. Therefore, since the frequency in which a pilot-tone exists is ¼ of a symbol clock, transition can be made by signal re-sorting without an additional multiplier. That is, after a symbol in which a carrier wave is restored is filtered though the matched filter 27, the symbol is output directly to an equalizer (not shown) at the end portion if the symbol is a QAM signal, and is output through the VSB sorter 28 to the equalizer if the symbol is a VSB signal.

Figure 5:
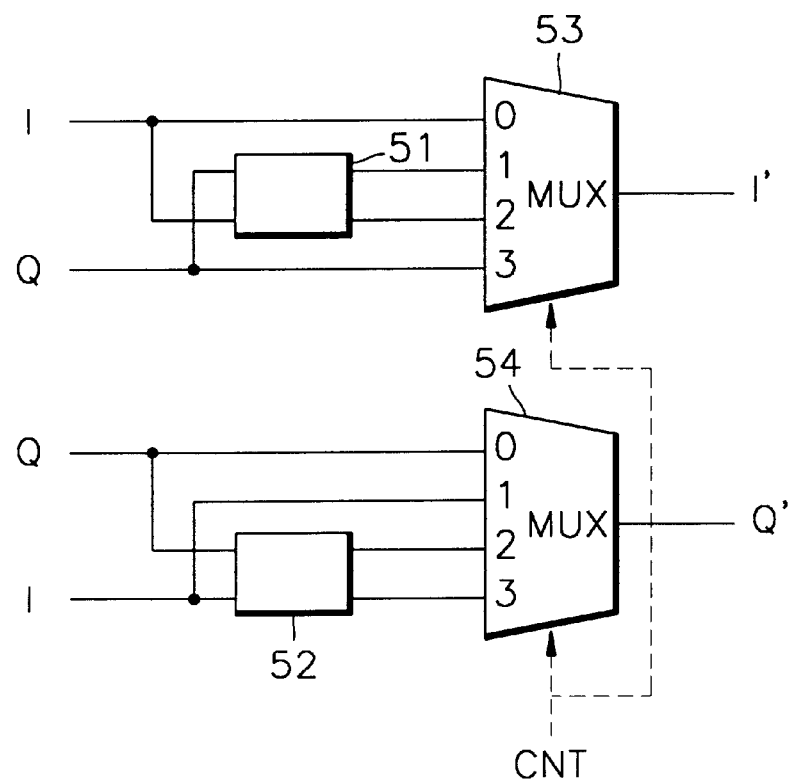
FIG. 5 is a detailed diagram of the VSB sorter of the receiver of FIG. 2.
Figure 6:
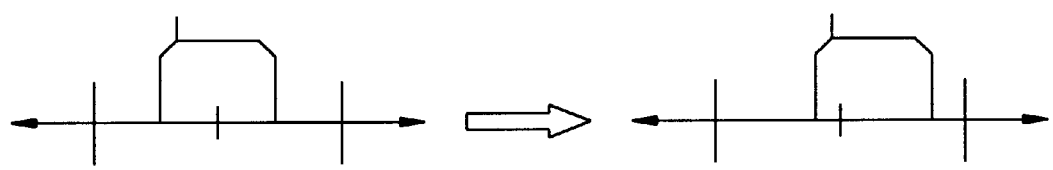
FIG. 6 illustrates spectrum changes by signal rearrangement of the VSB sorter of FIG. 5.

Referring to FIG. 5, the VSB sorter 28 has invertors 51 and 52 for inverting an I axis symbol and a Q axis symbol respectively, and multiplexors 53 and 54 for selectively rearranging an I axis symbol, a –I axis symbol, a Q axis symbol, and a –Q axis symbol. That is, the multiplexors 53 and 54 form an I' axis symbol, which is obtained by rearranging the I axis by selecting one of an I axis symbol, a –I axis symbol, a Q axis symbol, and a –Q axis symbol in accordance with the count of the counter (not shown), and a Q' axis symbol, which is obtained by rearranging the Q axis by selecting one of a Q axis symbol, a –Q axis symbol, an I axis symbol, and a –I axis symbol, in accordance with the counting of the counter (not shown), and outputs a restored VSB signal. As shown in FIG. 6, the frequency in which a pilot-tone exists is moved by ¼ of a symbol clock by the rearrangement of a VSB signal.

As described above, the VSB/QAM receiver of the present invention and the method thereof are completely digital. By restoring a carrier wave with a restored symbol clock after restoring symbol timing in the front portion of the carrier wave restoration unit, a frequency having a low symbol rate can be used, correction of the distortions in a carrier wave can be quickly accomplished, and requirement for additional hardware for receiving a VSB signal can be significantly reduced.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A vestigal sideband and quadrature amplitude modulation (VSB and QAM) receiver comprising:
    an analog-digital converter for converting a received analog signal into a digital signal in accordance with a clock having a predetermined frequency;
    an interpolator for restoring symbol timing by interpolating in an original location of a symbol a digital signal received from the analog-digital converter in accordance with a control of a timing processor;
    a carrier wave restoration unit for restoring a carrier wave of the digital signal by correcting distortions in frequency and phase of the symbol signal interpolated in the interpolator in accordance with a driving clock of the timing processor;
    a filter for matching a symbol signal in the carrier wave restored by the carrier wave restoration unit;
    the timing processor for calculating a timing error in the filtered symbol signal, controlling the interpolator based on the detected timing error, and generating the driving clock; and
    a VSB sorter for outputting the symbol output from the filter, the symbol in which the carrier wave and timing are restored, without change, or outputting the symbol after rearranging the symbol in accordance with a VSB/QAM mode.

2. The VSB and QAM receiver of claim 1, wherein the timing processor delays either of an I axis symbol and a Q axis symbol in accordance with the VSB/QAM mode by a half symbol cycle to change a signal input time.

3. The VSB and QAM receiver of claim 2, wherein the timing processor comprises:
    a delay for delaying a Q axis symbol output from the filter by a half symbol cycle;
    a multiplexor for selecting the Q axis symbol delayed in the delay if a signal is a VSB signal, and selecting the undelayed Q axis symbol if a signal is a QAM signal;
    a timing error detector for receiving the I axis symbol output from the filter and the Q axis symbol selected in the multiplexor, and detecting a timing error;
    a loop filter for generating a control voltage after a timing error detected in the timing error detector is applied; and
    a control and clock generating unit for generating a control signal for removing an offset of the interpolator and a symbol clock, by which timing is restored in accordance with the control voltage of the loop filter.

4. The VSB and QAM receiver of claim 1, wherein the carrier wave restoration unit comprises:
    an NCO;
    a mixer for compensating for frequency and phase distortions by multiplying the signal output from the interpolator by a signal output from the NCO;

an automatic frequency control (AFC) for calculating frequency and phase distortions from a signal output from the mixer and generating a correction value for the calculated distortion;

a VSB sorter for rearranging a symbol output from the mixer;

a digital frequency phase locked loop (DFPLL) for calculating frequency and phase distortions in the symbol rearranged in the VSB sorter, and generating a correction value for the calculated distortion; and a multiplexor for controlling the frequency of the NCO, by selecting a signal output from the AFC if a signal is QAM, and selecting a signal output from the DFPLL if a signal is VSB.

5. The VSB and QAM receiver of claim 1, wherein the VSB sorter moves a frequency, in which a pilot-tone exists, by ¼ of a symbol clock, by rearranging signals in a demodulated VSB signal.

6. The VSB and QAM receiver of claim 1, wherein the VSB sorter comprises:

an inverter for inverting each of an I axis symbol and a Q axis symbol output from the filter; and a multiplexor for outputting rearranged I' axis symbol and Q' axis symbol after selecting an I axis symbol, a Q axis symbol, a −I axis symbol and a −Q axis symbol in a predetermined order.

7. A method for receiving both a VSB signal and a QAM signal in a VSB/QAM receiver, the method comprising the steps of:

(a) converting an analog signal into a digital signal in accordance with a predetermined clock;

(b) extracting a symbol in the original symbol location by interpolating the digital signal converted in the step (a);

(c) restoring a carrier wave by correcting frequency and phase distortions of the symbol, which is extracted in the step (b), in accordance with a clock in which symbol timing is restored;

(d) calculating a timing error based on the signal restored in the step (c), restoring the symbol timing by controlling the interpolation location of the step (b) in accordance with the calculated timing error, and generating a clock in which timing is restored; and (e) outputting a signal, in which symbol timing and carrier wave are restored, without change, or outputting the signal after rearranging the signal in accordance with a VSB/QAM mode.

* * * * *